No. 810,206. PATENTED JAN. 16, 1906.
I. W. HEYSINGER.
LOCKING DEVICE FOR MOTOR CARS, AUTOMOBILES, AND THE LIKE.
APPLICATION FILED AUG. 21, 1905.
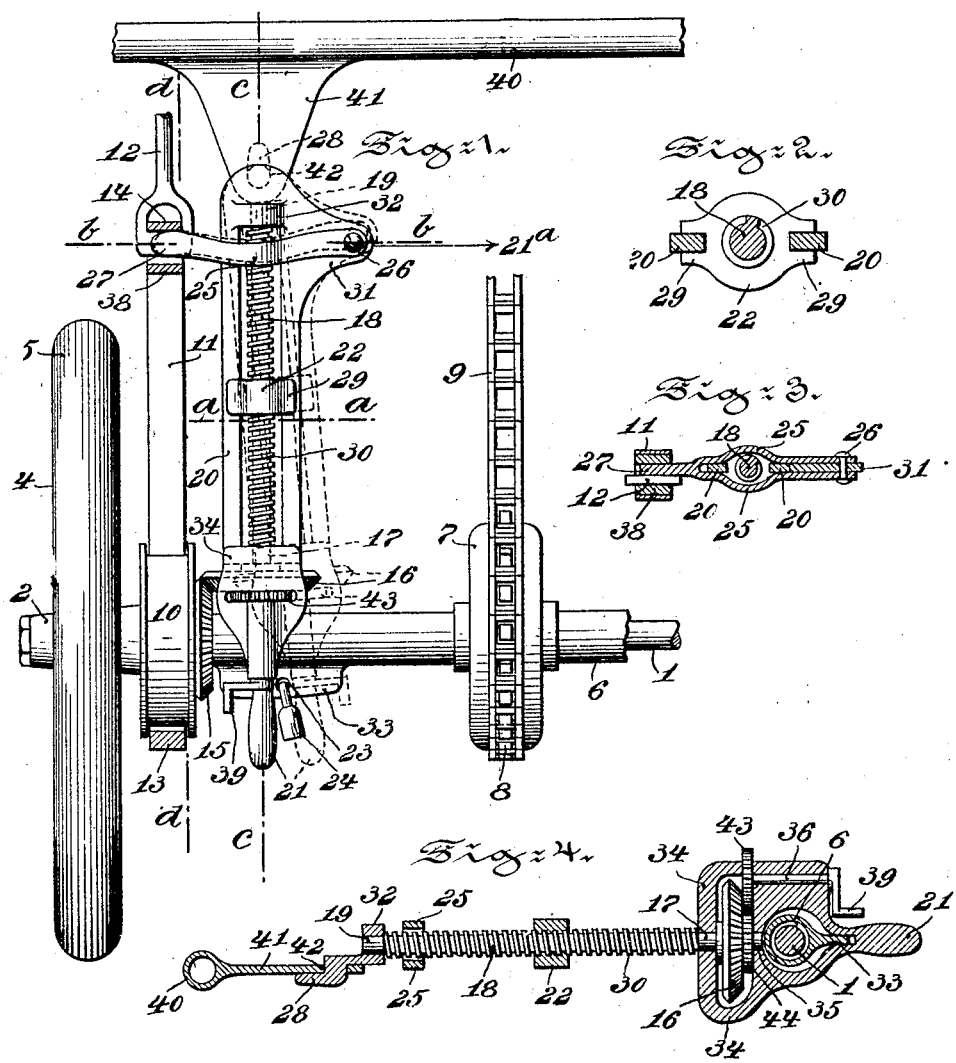

UNITED STATES PATENT OFFICE.

ISAAC W. HEYSINGER, OF PHILADELPHIA, PENNSYLVANIA.

LOCKING DEVICE FOR MOTOR-CARS, AUTOMOBILES, AND THE LIKE.

No. 810,206.  Specification of Letters Patent.  Patented Jan. 16, 1906.

Application filed August 21, 1905. Serial No. 275,065.

*To all whom it may concern:*

Be it known that I, ISAAC W. HEYSINGER, a citizen of the United States, residing at Philadelphia, in the county of Philadelphia and State of Pennsylvania, have invented a new and useful Improvement in Locking Devices for Motor-Cars, Automobiles, and the Like, of which the following is a full, clear, and exact description, reference being had to the drawings which accompany and form a part of this specification.

My invention relates to locking devices for wheeled vehicles, and especially for those in which the wheels are connected with the axle, as in motor-cars, automobiles, and similar wheeled vehicles, in which my locking devices are so constructed and adapted and applied as to permit the said vehicle to be freely moved about on its supporting-wheels to and fro, backward or forward, as when no such locking device is used, but to a limited distance only, after which said locking device operates to arrest the motion of said wheel or wheels to which it is connected, and so prevents the said vehicle from further travel, and in which said locking device is detachably connected with a gear or the like upon the wheel or wheels of said vehicle or with parts moving therewith, so that when thus detached the said vehicle may be operated to any distance as though such locking devices were not employed. It is necessary for such vehicles when temporarily stored in barns or elsewhere that they should be operable, so as to be run about freely to move them from one part of said building to another or to test the working of the machinery when in motion, or in case of fire to remove the machine from the building, so that a mere fixed lock rendering the wheels of the machine immovable would be impossible to be used under the above-described circumstances. Hence I provide a locking device which I call a "freeway-lock" and which will enable the machine to be freely run about to the extent of the movement of a slowly-moving part of said locking device, but which will prevent the machine from being used as a vehicle by unwarranted parties during the absence of the owner or under other analogous circumstances or when left standing on the street or highway.

My invention consists, essentially, of two detachably-connected operative units, the first unit permanently secured to and operated conjointly with and by the rotation of one or more of the supporting-wheels of the vehicle, preferably the driving-wheel, and the second unit constructed and adapted to be detachably put into operative connection with the said first unit, said second unit provided with a movement-reducing device to slowly move a connected part thereof toward a fixed abutment which when reached and impinged upon will arrest the further movement of the connected parts of said second unit through its connection with said first unit and arrest the further rotation of the wheel or wheels of said vehicles. The said second unit and said first unit are made detachable from each other, so that when thus detached the first unit will operate indefinitely and without affecting or being affected by the second unit, and also in means whereby the said units may be permanently locked apart from or into connection with each other, as desired.

My invention further consists in interposing between the slowly-moving part of said second unit and its abutment a connecting lever or piece adapted to be struck by the advance of said slowly-moving part before reaching said fixed abutment, whereby a friction-clamp may be operated against the wheel mechanism of said first unit, so as to slow down and finally arrest the rotation of the same.

My invention further consists of the construction and adaptation to each other of a toothed wheel rigidly connected with and traveling with a supporting-wheel of said vehicle and a second toothed wheel supported upon an adjustable carrier-frame and adapted to be geared with said first toothed wheel and locked fast in said geared position or disconnected by moving said carrier from said first toothed wheel, as desired, said second toothed wheel constructed to operate a nut-and-screw arrangement by means of which a slow movement is communicated to the latter, and said nut screwed along toward a fixed abutment upon the frame of said carrier and with or without the interposition of a lever or like device between said nut and said abutment to compress a brake or other movable part against said wheel of said vehicle or a part connected therewith, and so arrest the rotation of the same; and my invention also consists in the construction, as an article of manufacture, of a suitable frame preferably adapted to be pivoted at one end to a fixed part of said vehicle and free to be swung laterally from side to side at its opposite end in suitable supports on said vehicle and to be locked in position at one side of its limit of movement or the other, and thereby operatively connected with or detached from a gear-wheel or the like connected with one of the wheels of said vehicle, said article of manufacture constructed and adapted for any of the various styles of motor-cars, automobiles, or the like already in use and in such shape as to be applied to such machine by any skilled mechanic without the exercise of further invention; and my invention also consists of the special construction and adaptation of the different parts of my device, substantially as set forth in this specification or illustrated in the drawings, or with such obvious modifications as special circumstances may require, and which would be made by any skilled mechanic without the exercise of further invention.

Referring to the drawings, Figure 1 is a plan view from above of a part of the running-gear of a motor-car or the like embodying my invention, my locking device being shown in full lines as connected at 15 and 16 with the vehicle-wheel 2 4 5 and in the dotted outlines as detached therefrom. Fig. 2 is a cross-sectional view along the dotted line *a a* of Fig. 1 of the nut-supporting frame with the rotating screw in the middle, sectionalized, and the slowly-moving nut 22 (shown in end view.) Fig. 3 is a similar cross-section taken along the dotted line *b b* of Fig. 1 near the abutment 32 and showing the lever or separately-movable piece which operates the brake 11 of Fig. 1. Fig. 4 is a longitudinal vertical section of the locking device, taken along the dotted line *c c* of Fig. 1 and pivotally connected at one end with the fixed parts 40 and 41 of the vehicle and straddling at the opposite or free end the axle 1 and the fixed tubular and supporting casing 6 of the axle of the rear wheels, said locking device adapted to be slipped to and fro along said axle to connect or disconnect the same from the bevel gear-wheel 15, as shown in Fig. 1; and Fig. 5 is a sectional view taken along the dotted line *d d* of Fig. 1, showing the brake with its foot-stirrup link 12 and the end of the lever or movable piece 27, which is struck and moved by the nut 22, impinging against the lever 25, as shown in Fig. 4.

The numbering of the different parts in all the figures is uniform.

Referring to the drawings, 5 represents the tire of one of the wheels of a motor-car, 4 being the body of the wheel and 2 the center where it is secured to turn with the axle 1. (See Fig. 5.) The axle extends to the driving-gear 7 and 8 in the middle of the axle, being continued beyond, as shown, the compensating gear for the two halves of the axle not being represented. The tubular axle-covering which supports the axle and its attached wheels is represented at 6, Figs. 1, 4, and 5, and the brake-cylinder is shown at 10, being hollow and open inward and with the tubular axle-casing extending through the same to relieve the strain on the axle. Only one of the driving-wheels 2 4 5 is represented, the opposite one not being required to illustrate my invention. 40 represents a fixed part of the machine in front of the driving-axle, preferably a part of or connected with the front axle, and 41 is an extension thereof, to which my locking device is shown as pivoted at its front end. The connections between the front and rear axles and the body of the machine are not shown, being so well known in the arts to which such machines pertain. Suffice it to say that the part 40 and the tubular casing 6 are parts of a single composite structure on which the body or superstructure of the vehicle is supported. The reference to my invention will now be clearly understood.

Pivoted at its forward end 28 to the extension 41 of the fixed forward part of the vehicle 40, so as to be capable of being oscillated laterally at its rear end 21 along the tubular casing 6 of the driving-axle 1, extends a longitudinal frame and its attached parts. This frame, as shown in the figures, is detachable— that is to say, by taking the running-gear of the vehicle apart the front end at the oscillating frame can be removed from or pivoted to the part 41 and the rear end slipped off from or over the tubular axle-casing 6 at its adjacent end and the axle and wheels then put into place; but when applied as shown in the drawings it cannot readily be detached unless by taking the machine apart. A toothed bevel-wheel 15 is rigidly secured so as to operate with the rotation of the driving wheel and axle. As I show it it forms an annular rim to the brake-cylinder 10, the axle and supporting-casing extending through within. So constructed this bevel-wheel must rotate with the rear axle and driving-wheel and cannot be loosened therefrom.

The oscillating frame consists of the following coöperating elements. There are two longitudinal side bars 20 20, Figs. 1 and 2, between which extends a long screw 18, the end next the pivot end of the frame being journaled in a very firm head 32, which terminates the bars 20 20 and connects them in one structure. Beyond these parts is the pivot connection 28 42, by which the frame is attached to the fixed part of the vehicle 41 40. As shown in the figures, in order to prevent this pivot-bearing from being disconnected I provide as bent downward and then longitudinally forward a pin 28, which is thus buttoned into the hole 42 of the fixed part 41 when the frame has been tipped up behind to permit the insertion, and this joint cannot then be broken except by breaking the metal. Of course a bolted pivot-joint may be used, if desired. The bars 20 20 of the frame are also joined at their rear end in front of the axle, preferably by casting the frame in a single structure, and at this junction the long screw 18 is journaled at this end. Secured to the screw so as to always rotate with it is the toothed bevel-wheel 16, which is at right angles to the other bevel-wheel 15 and is adapted to have its toothed gear mesh in with the opposite one. At the rear end of the frame there is a transverse opening large enough to admit the casing of the rear axle without play up or down, but enlarged from front to rear, so as to permit the frame to be oscillated laterally along the tubular axle-casing on its pivot 28, and from the rear of the frame projects a convenient handle 21, by means of which the frame can be oscillated from side to side. At this portion of the length of the said tubular axle-casing 6 (see Fig. 4) extends to the rear a plate 33, firmly secured to the said casing, and in this plate is a hole 23, adapted to receive the hasp of a padlock 24. (See Fig. 1.) This hole is so located that when the frame has been swung at its rear end toward the bevel-wheel 15 and when the teeth of the two bevel-wheels have meshed in with each other then a padlock of any special construction can be locked into this hole, when it will be impossible to separate the gear, and, conversely, when the rear end of the frame has been swung in an opposite direction the padlock inserted in the same hole will prevent the bevel gear-wheels from approaching each other and the movements of the vehicle will not affect or be affected by the locking device of which the frame is a part. The teeth of the bevel-wheels being meshed in with each other, as described, as the vehicle is moved forward or backward, whether merely pushed by hand or operated by the motive power of the car, the longitudinal screw 30 will be rotated on its axis coincidentally with the rotation of its actuating-wheel 16, which in turn is operated by the rotation of the bevel-wheel 15, necessitated by the rotation of the wheels 2 4 5. Along this screw 30 travels an internally-screw-threaded nut 22, (see Figs. 2 and 4,) and to prevent this nut from being rotated it is provided with cleft ears 29 29, (see Fig. 2,) so that the turning of the screw 18 will move the nut 22 forward or backward along the frame 20. If the screw 18 has thirty turns and the wheel 5 has a circumference of ten feet and if the nut 22 be in the middle of the screw 18 at starting, then the vehicle can be moved forward fifty yards or moved backward fifty yards without any interference, the nut 22 merely traveling to or fro along the screw 18, and the vehicle can be alternately moved backward and forward to the extent of one hundred yards all day without interference; but if this travel be continued farther than this limit then the nut 22, if the car be moving forward, will be carried against the solid abutment 32 and its motion will be suddenly arrested and with it the advance of the vehicle. If much speed has been acquired, the sudden shock may be sufficient to tear the bearings to pieces or strip the tires or otherwise permanently injure the machine; but certainly no unwarranted person attempting to use the car could proceed farther in his attempt, and certainly no owner could fail to see that his car had been tampered with and seriously injured. This fact alone would prevent tampering with a machine to which this locking device was applied; but to prevent such sudden stoppage and shock I apply a special device, which consists, essentially, of a lever or like device, against which the traveling nut 22 impinges before it has struck the abutment 32. The nut will thus carry the free arm of this lever forward. This lever is shown at 27, Fig. 3, and also in Fig. 1. It is pivoted to a lateral extension 31 of the frame 20 20 at 26, the free end 27 extending across the frame into the front crotch 14 of the brake-band 11 11, which is ordinarily operated by a foot-lever on the machine through a stirrup 12, Figs. 1 and 5.

In this construction no special spring or friction or braking device is required to give a gradual stoppage to the wheels, the ordinary brake on one side of the car being utilized, the stirrup of the foot-brake and the lever of the locking device lying in contact, one superposed upon the other, as shown; but, if desired, I use a special braking or spring or friction device specially attached to the locking device itself and operating directly or indirectly upon the running-gear of the vehicle.

The handle 21, as shown in Figs. 1 and 4, projects over the axle to the rear; but if it be desired to operate the oscillating frame from the side then I indicate by the arrow 21ª in Fig. 1 how this handle may be extended across so as to project from the car laterally and be locked upon a side bar of the car instead of upon an extension of the casing of the rear axle. Of course it may project in any direction or position desired, and the specific construction will depend in any case upon the special sort of motor-car or other vehicle to which it is to be applied. For such various applications the figures of the drawings may be described as diagrammatic, but clearly presenting the structure as a whole for such a machine as I illustrate.

It will occur that the nut 22 may sometimes stand near one end of the screw 18, so that while the sum of movements remains the same forward and backward, yet not enough leeway is given in one of these directions. I therefore prefer to add a little spur-wheel 43, Figs. 1 and 4, with its shaft 36 and crank 39, and this engages with the little spur-wheel 44 behind the bevel-wheel 16 of the screw 18. By this crank the parts 16, 18, and 22 may be operated, while the frame is out of contact with the spur-wheel 15 of the driving-gear, and the nut 22 run up to any desired point along the screw; but when the frame is locked up in connection no tampering can be done of course.

It is impossible to show or describe in a single drawing and description the multifarious forms which this locking device must assume to be adapted to the many forms, shapes, and sizes of motor-cars in use; but the alterations required are simply mechanical when the present drawings and description are clearly understood. The brake-band may clamp upward instead of forward, and the screw 18 may be perpendicular, a double arrangement for the two driving-wheels may be used for a duplicate locking device instead of a single one, the frame may work with a slide movement instead of on a pivot and may extend along the rear axle instead of at right angles thereto, and the padlock may be replaced by a lock attached to the machine, either key or combination. So the slow nut movement may be along the arc of a circle instead of in a right line, the bevel-gears may be replaced by worm and spur gears, and other modifications may be made at will and all without departing from the principles, construction, and application of the invention as herein set forth.

These locking devices may be permanently built in with the machine or may be made up separately for each special motor-car in the market and sold separately, so as to be applied by any skilled mechanic to the machines already in use. So, also, in vehicles like buggies or wagons, in which the wheels have hollow hubs and revolve on projecting spindles, each wheel on its own account, the bevel-wheel may be secured to the inward end of the hub, all the rest of the parts being the same. Therefore I do not confine myself rigidly to the specific construction herein shown and described, but vary the same to suit special requirements, such as would be employed by any mechanic skilled in the art to which my invention pertains and without the exercise of any further invention therein.

Having now described my invention, what I claim, and desire to secure by Letters Patent, is—

1. In a wheeled vehicle, a locking device consisting of the combination of two operative units, the first unit secured permanently to the wheel or axle upon which said vehicle travels, and adapted, when properly connected with the second of said units, to communicate motion to an operative part thereof, and the second unit, detachably connected with said first unit, and adapted to be disconnected therefrom, said second unit provided with a primary moving part adapted to be directly moved by the movement of said first unit, in combination with a more slowly moving secondary element connected therewith, and adapted to be moved along a definite line of travel, together with a fixed abutment against which said secondary element shall, after an interval, be arrested, and thereby arrest the movement of the primary moving part of said second unit, and of the connected first unit, and so arrest the travel of said vehicle, substantially as described.

2. In combination with the driving wheel and axle of a motor-car, or the like, provided with means for communicating motion to a second and detachable unit, said second unit consisting of a primary part adapted to be directly moved by the rotation of said wheel, and a secondary part and an abutment, said secondary part receiving a slower motion from said primary part, and operating a separately-moved part toward said abutment, provided therefor, by which the movement of said more slowly-moving part shall, after a considerable number of rotations of said wheel, be arrested, and so limit the travel of, and arrest the rotation of the wheel of said motor-car, substantially as described.

3. A locking device for motor-cars, and the like, consisting of a detachable frame carrying an elongated screw-threaded rod, and means for communicating rotary motion thereto, a screw-threaded block adapted thereto, and moved by the rotation thereof, and suitable fixed journals in said frame for the longitudinal bearings of said rod, and an abutment on said frame against which said block will impinge when its limit of travel has been reached, together with a toothed wheel secured to said screw-rod, and a corresponding toothed wheel on the wheel or axle of said motor-car, said frame adapted to be locked in place, with said toothed wheels meshed into each other, or moved apart so that said toothed wheels shall be disconnected from each other, substantially as described.

4. As an article of manufacture a detachable locking device for motor-cars and the like, consisting of a frame carrying a toothed gear-wheel and a longitudinal screw-rod secured thereto and extending along said frame, a screw-nut engaged with the threads of said screw-rod, means for preventing the rotation of said nut, a journaled bearing at each end for said screw-rod, a handle for moving the free end of said frame laterally, a pivot-bearing for the opposite end of said frame to connect the same with a fixed part of said car, and a toothed gear-wheel secured to one of the driving-wheels of said motor-car, and adapted to be detachably connected with, or disconnected from the said toothed wheel of said frame, the whole constructed to operate substantially as and for the purposes herein shown and described.

5. A freeway locking device for motor-cars, and the like, adapted to permit the said car to be moved a definite distance upon its running-gear, without interference, and to then arrest the further movement of said running-gear, consisting of a toothed wheel around the axle of one of the driving-wheels of said car, a pivoted frame laterally movable at one end, and having its free end provided with a toothed wheel adapted to gear in with said opposite toothed wheel on said axle, or be moved out of contact by moving said frame laterally away, and means for locking said frame either in or out of gear, said frame provided with an elongated screw-rod secured to and rotating with said toothed wheel of said frame, a nut made to be screwed along said rod, and prevented by suitable means from rotation thereupon, abutments for said nut at the ends of said rod, together with a pressure device, adapted to gradually retard the rotation of said rod and said toothed wheels, and the wheels of said motor-cars, said device interposed between said nut and an end of said rod, and adapted to operate by gradually increasing the pressure directly, or indirectly upon said car-wheel, substantially as, and for the purposes described.

6. A locking device for wheeled vehicles, consisting of a toothed bevel-wheel surrounding the axle and rigidly rotated with said vehicle-wheel, a frame pivotally secured to a fixed portion of said vehicle, and extending along to the axle thereof, said frame provided with a toothed bevel-wheel at its axle end adapted to be detachably meshed into the toothed bevel-wheel of said vehicle-wheel, a screw-threaded rod secured to said bevel-wheel on said frame. a screw-nut threaded on said rod, and protected against rotation thereupon, an abutment for said nut at the end of said rod, a handle for laterally moving said frame, in and out of gear with said bevel-wheel on said vehicle-wheel, and an independently-movable part interposed between said nut and said abutment at one of the ends of said rod, said movable part adapted to be struck by the advance of said nut, and said movable part operatively connected with the brake mechanism, so as to cause the brake to be gradually compressed against a brake-cylinder attached to said vehicle-wheel, substantially as described.

7. A locking device for motor-cars, and the like consisting of a detachable frame, movably secured to a fixed part of said car, and adapted to be moved to or fro along the driving-wheel axle of said car, said frame provided with a longitudinal screw-threaded rod, a toothed wheel rigidly connected therewith, a nut adapted to be screwed along said rod, and means for preventing the rotation of said nut, an abutment for said nut on said frame, an independently-movable part on said frame operated by the advance of said nut along said rod, said movable part constructed to operate a brake device on said car, together with a toothed wheel rigidly connected with a driving-wheel of said car, said frame adapted to be moved in one direction so as to put the two toothed wheels in gear with each other, or to be moved in an opposite direction so as to disconnect them, together with means for securely locking said frame in place with its gear connection either open or closed, substantially as described.

8. In combination with a motor-car, its driving wheel and axle, and means for propelling said car, a toothed gear-wheel upon said wheel and axle, a pivoted and laterally-movable frame, having its free end contiguous to said driving wheel and axle, a toothed gear-wheel on said frame adapted to be detachably connected with the toothed gear-wheel of said driving wheel and axle, a screw-rod secured to the gear-wheel of said frame, a nut on said rod, means for preventing rotation of said nut, an abutment for said nut at the end of said rod, a guide-opening in said frame at its free end constructed to accommodate the axle of said car within the same said frame, adapted to be moved and guided at its free end along said axle, and means for locking said frame with a gear connection between said toothed wheels, or locking them apart when separated from each other, together with a handle for operating said frame substantially as described.

9. A locking device for wheeled vehicles consisting of a laterally-movable frame carrying a gear-wheel, a screw-rod secured thereto, a screw-nut on said rod, means for perventing rotation of said nut, an abutment at the end of said rod, an independently-moving part along said rod, adapted to be engaged and forced along by the advance of said nut, an operative connection between said moving part, and a friction-brake on said vehicle, together with a gear-wheel secured to the wheel of said vehicle, said frame detachably connected with, or disconnected from making a gear connection with said vehicle-wheel, together with means for locking the gear-wheel of said frame to the gear-wheel of said vehicle-wheel, substantially as described.

10. In a locking device for wheeled vehicles consisting of a gear-wheel secured to one of the supporting-wheels thereof, a detachable frame with slow-motion mechanism, an abutment for the same, and a gear-wheel adapted to be detachably connected with the gear-wheel of said vehicle-wheel, together with means for locking said gear-wheels together, or apart, a supplementary device for moving said slow-motion mechanism into any desired position along said frame while said gear-wheels are disconnected from each other, substantially as and for the purpose set forth.

11. In combination with a vehicle-wheel supporting a toothed gear-wheel, a detachable frame supporting a gear-wheel adapted thereto, a screw-rod secured to said latter, a nut on said rod, means for preventing rotation of said nut, and an abutment for said nut at the ends of said rod, a supplemental nut-setting gear, and a handle adapted to operate the same, the whole so constructed that when said frame is detached from said vehicle-wheel, said rod may be independently rotated by said supplemental gear and handle, and said nut screwed along said rod to any required position thereupon, substantially as described.

ISAAC W. HEYSINGER.

Witnesses:
  GEO. W. REED,
  ERNEST W. HEYSINGER.